July 22, 1969   G. MÜLLER   3,456,993
SLIDING BEARING WITH PNEUMATICALLY OR HYDRAULICALLY
PRESSED BEARING CUPS
Filed Nov. 29, 1967
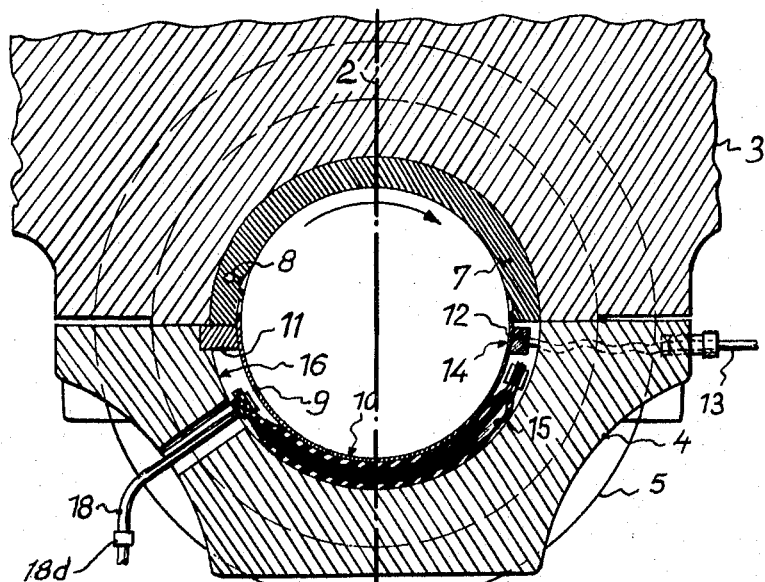
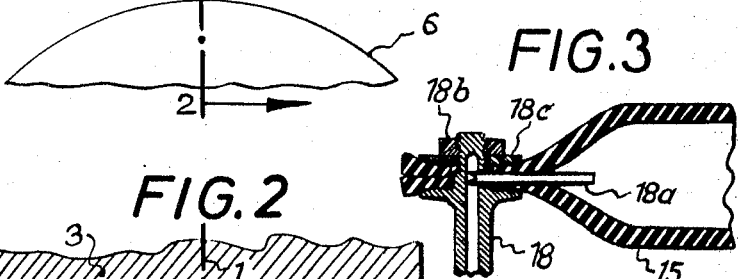
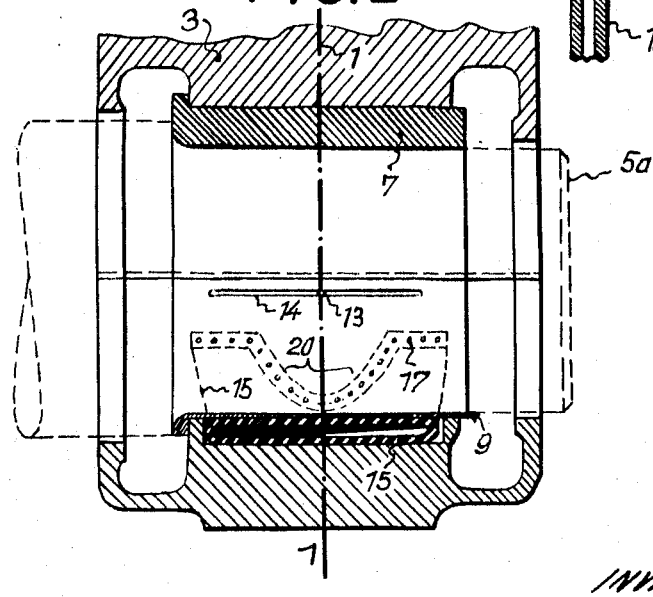
INVENTOR:
Gernot Müller

United States Patent Office

3,456,993
Patented July 22, 1969

3,456,993
SLIDING BEARING WITH PNEUMATICALLY OR HYDRAULICALLY PRESSED BEARING CUPS
Gernot Müller, Krefeld, Germany, assignor to Joh. Kleinewefers Sohne Maschinenfabrik, Krefeld, Germany
Filed Nov. 29, 1967, Ser. No. 686,637
Claims priority, application Germany, Dec. 14, 1966, K 60,922
Int. Cl. F16c 7/04, 35/00, 27/00
U.S. Cl. 308—9                                           4 Claims

ABSTRACT OF THE DISCLOSURE

A sliding bearing, especially for rolling mills, calenders and calibrating calenders for metals, synthetic materials, cardboard and paper, in which the lower bearing box includes a thin lamella or foil yieldable in response to the heat expansion of the shaft portion journalled in said foil, said foil being supported over a major surface portion thereof by a pneumatic or hydraulic pressure cushion arranged between said foil and the adjacent housing portion of the bearing and being pressed by said cushion against the shaft portion journalled in said foil.

---

The present invention relates to a sliding bearing, particularly of the type as it is used for journalling slowly turning shafts of heavy processing machines, as for instance in connection with steel mills, synthetic or rubber rolling mills, drawing calenders or calibrating calenders for synthetic materials, papers, or the like.

Since, when processing or machining steel or synthetic materials, the shaft pivots become very hot, it is necessary that the expansion of said pivots be taken into consideration at the start of the working process when the bearing is still in cold condition, and to provide for a precise dimensioning of the bearing play. With calibrating rolling mills for calibrating thin metal sheets, foils, or cardboard, there is encountered the further difficulty that due to the unavoidable wear and compacting of the bearing boxes a certain bearing play will develop within a certain period of time, which bearing play has to be corrected from time to time by a corresponding adjustment. Such heretofore known mechanical adjusting devices have, however, not proved practical inasmuch as they have been handled incorrectly in most instances and the expansion of the shaft pivot has not been taken precisely into consideration.

A play during the operation, however, brings about, for instance with calibrating rolling mills for calibrating thin foils, that the upper roller of the rolling mechanism will after the completion of the passage of the material to be calibrated drop down to the extent of the bearing play and in this way will engage the lower roller or, if the bearing play is rather considerable, will impact upon the lower roller. This continuous beating by the upper roller which frequently has a weight of several tons, brings about undesired concussions of the entire machine and in particular causes damage to the rollers.

Even if a material is passed through the machine which is highly plastic when heated, for instance when such material is passed through pulling calenders for synthetic material, the bearing play causes such a movability of the rollers that the roller will float on the highly viscous foil and with less viscous parts of the foil is even lifted so that the thickness of the foil will vary within wide limits. These variations in the thickness usually exceed the permissible tolerances of thin foils. It is therefore important that the roller axis in the bearing will also with continuously varying load be held at a tolerance of a few μ precisely in the bearing center while, of course, the necessary lubricating layer must not be pressed aside.

For remedying this drawback, in addition to the above mentioned mechanical adjusting devices, also pneumatic-hydraulic adjusting devices have become known which have been able to solve the above outlined problem to a certain extent. These post-adjusting devices comprise one or more pressure pistons built into the bearing housing, said pressure pistons carrying the lower bearing box and pressing against the roller pivot at a constant pressure. This known device, however, has the drawback that the bearing boxes, in view of the pressure effect exerted by the piston, deform to such an extent that at the area where the piston becomes effective, the Mitschel's lubricating wedge will be interrupted which under all circumstances should be maintained. Also the bearing boxes employed for preventing the said deformation have not proved practical because at the temperature expansion of the roller pivots they yield insufficiently in their cylindrical shape which causes seizing of the bearing boxes.

It is, therefore, an object of the present invention to provide a hydro-pneumatic adjustable bearing which is so designed that bearing housings of heretofore known shape and design can be employed further while the cost for manufacturing a bearing according to the invention does not exceed the cost for manufacturing conventional bearings to any great extent.

This object and other objects and advantages of the present invention will appear more clearly from the following specification in connection with the accompanying drawing, in which:

FIG. 1 is a vertical cross section through the upper bearing of a calibrating roller system.

FIG. 2 is a vertical longitudinal section taken along the line 2—2 of FIG. 1.

FIG. 3 shows the left-hand lower portion of FIG. 1 on a larger scale than the latter.

The bearing according to the present invention is characterized primarily in that the lower bearing box is designed in the form of a thin lamella which, during the heat expansion of the shaft pivot easily yields, and said lamella over the major portion of its surface is supported by a pneumatic or hydraulic pressure cushion arranged between said lamella and the bearing housing and is pressed against the shaft pivot. In this way it will be assured that the lower bearing box is over its entire surface at constant pressure pressed against the shaft pivot, and that the bearing box will, without resistance of any increase in the diameter of the shaft pivot, not prevent the formation of the lubricating wedge or interfere therewith.

Referring now to the drawing in detail, with a bearing of the above-mentioned type, for instance, the upper bearing box 3 is formed by a portion cast on to the machine frame. The lower bearing box 4 is screwed onto the upper bearing box 3. The upper roller 5 journalled in this bearing operates together with a lower roller 6 therebelow in such a way that between the two rollers a material, for instance paper cardboard, is calibrated down to a certain measurement. The thickness to be calibrated will be maintained due to the fact that the two rollers are firmly adjustable to any desired distance by means of a fine adjusting device not shown in the drawing.

In the upper bearing housing 3 there is arranged a bearing box 7 of customary shape and thickness which upper bearing housing receives the lubricant under pressure at the left-hand side through a pressure feeding line 8, if the roller rotates in the direction indicated in the drawing.

The bearing box 9 arranged in the bearing cover 4 comprises a relatively thin lamella which is covered by a bearing material 10. To the left-hand side there is riveted or welded a block 11 which prevents the two bearing boxes from turning. On the right-hand side of the bearing box there is provided a reinforcement 12 which serves for connecting a lubricating feeding line 13 and for providing a lubricating groove 14. The uniform pressure at which this thin bearing box is pressed against the roller pivot of roller 5 is effected by a hose cushion 15 which is inserted between the bearing box and the turned out portion 16 of the bearing cover 4. The cushion 15 is inserted in flat form. The ends of the cushion 15 are sealed by riveted flaps 17 so that a pressure cushion is formed which withstands high pressure. The feeding of pressure to the cushion is effected at one end through the correspondingly designed flaps by means of a screwed-in pressure feeding line 18 having a pressure relief valve 18d. FIG. 3 illustrates in section and on a somewhat larger scale than FIG. 1 the connection between the conduit 18 and the interior of the pressure cushion 15 by means of a flat tube 18a and also shows the connection of the conduit 18 to the marginal portion of cushion 15 by means of a nut 18b and a washer 18c. In order to permit the lubricating wedge to form between the lower bearing box 9 and the shaft pivots in the proper form, it is necessary that the pressure exerted upon the pressure cushion on the right-hand side of the bearing box is somewhat less.

According to a further development of the present invention, this will be realized by reducing the engaging surface of the pressure cushion at the said side, preferably by a recess 20 in the center.

What I claim is:

1. A sliding bearing, especially for rolling mills, calenders, and calibrating calenders for metals, synthetic materials, cardboard and paper, which includes: an upper bearing box and a lower bearing box detachably connected to said upper bearing box, said lower bearing box having its inner peripheral portion which is intended for engagement with a shaft to be journalled therein formed by a relatively thin foil yieldable in response to heat expansion of the shaft portion to be journalled therein, and fluid operable pressure cushion means supported by said lower bearing box and engaging one of the major surface areas of said foil for exerting pressure thereon to press said foil in a direction toward the diametrically opposite portion of said upper bearing box and thereby against the shaft portion journalled in said bearing.

2. A bearing according to claim 1, in which said pressure cushion means has a flat semicylindrical shape and together with said foil has a thickness approximately equalling that of said upper bearing box.

3. A bearing according to claim 1, in which said pressure cushion means has that portion thereof recessed which is adjacent to the foil area where a lubricating wedge is to form, thereby slightly reducing the pressure exerted by said pressure cushion means upon the said foil area.

4. A bearing according to claim 1, which includes pressure fluid conveying conduit means leading into said pressure cushion means, and pressure relief valve means in said conduit means for selectively feeding pressure fluid means into said pressure cushion means for cooling same, said pressure relief valve means being adjustable to the desired pressure in said pressure cushion means.

References Cited

UNITED STATES PATENTS

| | | | |
|---|---|---|---|
| 2,614,896 | 10/1952 | Pierce | 308—26 |
| 3,101,979 | 8/1963 | Mard | 308—26 |

CARROLL B. DORITY, Jr., Primary Examiner

U.S. Cl. X.R.

308—26